(12) United States Patent
Hojo

(10) Patent No.: US 6,311,752 B1
(45) Date of Patent: Nov. 6, 2001

(54) PNEUMATIC RADIAL TIRES WITH STIFFENER RUBBER HAVING HARD AND SOFT STIFFENER RUBBER MEMBERS

(75) Inventor: Katsunobu Hojo, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/414,506

(22) Filed: Oct. 8, 1999

(30) Foreign Application Priority Data

Oct. 8, 1998 (JP) .................................................. 10-286279

(51) Int. Cl.$^7$ ............................. B60C 15/00; B60C 15/06
(52) U.S. Cl. ............................. 152/541; 152/539; 152/547
(58) Field of Search .................................... 152/541, 539, 152/547

(56) References Cited

U.S. PATENT DOCUMENTS

| | | |
|---|---|---|
| 4,917,166 | 4/1990 | Iuchi . |
| 5,669,994 | * 9/1997 | Tsuruta .................................. 152/541 |

FOREIGN PATENT DOCUMENTS

| | | |
|---|---|---|
| 0 698 513 A2 | 2/1996 | (EP) . |
| 0 826 524 A1 | 3/1998 | (EP) . |
| 8-225005 | 9/1996 | (JP) . |

* cited by examiner

Primary Examiner—Adrienne C. Johnstone
(74) Attorney, Agent, or Firm—Sughrue, Mion, Zinn, Macpeak & Seas, PLLC

(57) ABSTRACT

A pneumatic radial tire comprises a carcass of at least one rubberized cord ply having a main carcass body and a turnup portion, and a stiffener rubber taperingly extending between the main carcass body and the turnup portion toward an end of the tread portion, wherein the stiffener rubber comprises a hard stiffener rubber member located near to the main carcass body and a soft stiffener rubber member located along the turnup portion over the hard stiffener rubber member, and the hard stiffener rubber member convexly projects toward the outside of the tire at a cross-section of the tire in a region between a normal line $L_V$ and a line segment $L_H$, and a height of the hard stiffener rubber member from the outer surface of the main carcass body on a normal line L is maximum in a region from the line segment $L_H$ toward the end of the tread portion.

11 Claims, 17 Drawing Sheets

Comparative

<u>Comparative</u>

PNEUMATIC RADIAL TIRES WITH STIFFENER RUBBER HAVING HARD AND SOFT STIFFENER RUBBER MEMBERS

BACKGROUND OF THE INVENTION

1. Field of the Invention

This invention relates to a pneumatic tire, and more particularly to a pneumatic radial tire for use in a heavy vehicles such as truck, bus and the like having an aspect ratio of not more than 70 and having excellent bead portion durability.

2. Description of Related Art

In pneumatic radial tires running under load, there is caused a so-called bead portion fall-down phenomenon where a pair of sidewall portions are largely flexed at a position corresponding to a ground contact region but also a bead portion located outside a flange of a rim in a radial direction of the tire falls down toward the outside of the tire. Based on such a phenomenon, a large compression strain is applied to the inside of the bead portion, occasionally an end part of a turnup portion of a carcass existing in the sidewall portion near the bead portion.

Further, the movement of a tire member is caused along substantially a circumference of the tire in a zone ranging from the bead portion to the sidewall portion, which corresponds to positions of a leading part and a trailing part in the ground contact region of the tire tread portion. Hence, a shearing strain along the circumference of the tire is also applied to the turnup portion of the carcass based on such a movement. As a result, the shearing strain and the compression strain are repeatedly input to the end part of the carcass turnup portion during the running of the tire under loading, rubber fatigue at the end part of the carcass turnup portion is promoted and finally cracks are apt to be caused in the rubber along such an end part. Once the rubber cracking is caused, it progresses up to the occurrence of separation failure as the running distance of the tire becomes long.

Such problems in the bead portion of pneumatic radial tires for passenger cars running under a relatively low load are scarce, but is easily caused in large-size pneumatic radial tires for heavy vehicles such as truck, bus and the like running under a heavy load. This is particularly true in low-section profile tires (tubeless tires) recently increasing their use frequency and having an aspect ratio of not more than 70. Therefore, this trouble is a serious problem in such tire users and the solution thereof is strongly demanded. As to the large-size radial tire, there have been taken the following countermeasures for improving the separation failure in the carcass turnup portion.

In the first countermeasure, as shown by a diagrammatically section view of a part of the tire ranging from a bead portion 1 to a sidewall portion 2 in FIG. 14, a bead portion reinforcing cord layer 8 is arranged so that an end of the cord layer 8 is terminated inward from an end of a turnup portion 5b of a carcass 5 wound around a bead core 4 from an inside of the tire toward an outside thereof in the radial direction and the other end is extended along an outside face of the turnup portion 5b to an inside face of a main body 5a of the carcass 5. In this case, the other end of the reinforcing cord layer 8 at the side of the main body 5a of the carcass 5 is terminated outward from the end of the turnup portion 5b in the radial direction. Also, steel cords are used in the reinforcing cord layer 8. Moreover, reference numeral 7A is a bead portion reinforcing rubber known as stiffener rubber.

In general, the second countermeasure is a widely used means. As shown by a partial section view in FIG. 15, a stiffener rubber 7A taperingly extending between the main body 5a of the carcass and the turnup portion 5b thereof outward from the bead core 4 along the main body of the carcass in the radial direction. It is constructed with a hard stiffener rubber segment 7A-1 arranged inward along the main body of the carcass in the radial direction and having a substantially a triangular shape at a section thereof and a soft stiffener rubber segment contacting with an outer face of the rubber segment 7A-1 and arranged along the inner face of the turnup portion 5b of the carcass. The soft stiffener rubber segment 7A-2 has a Shore A hardness of not more than 55° and a volume ratio of the soft stiffener rubber segment 7A-2 occupied in the stiffener rubber 7A is at least 10% but is made smaller than that of the hard stiffener rubber segment 7A-1. Moreover, steel cords are applicable to the bead portion reinforcing cord layer 8.

The third countermeasure is a unique means for improving the durability of the bead portion as disclosed in JP-A-8-225005. As shown in FIG. 16, a hard stiffener rubber segment 7B-1 in a stiffener rubber 7B is arranged near the main body 5a of the carcass as a deformation input-blocking rubber member having a maximum thickness portion at least located toward the side of the tread portion from a vertical line Lv drawn from the end 5bE of the turnup portion 5b to the outer face of the main body 5a of the carcass. A soft stiffener rubber segment 7B-2 is arranged along an inner face of the turnup portion 5b. This bead portion durability improving means is based on a technical idea entirely different from strain is mitigation and strain control of the first and second countermeasures and has a dominant position over the first and second countermeasures.

As means for improving the carcass turnup portion of the large-size pneumatic radial tire, according to the above first countermeasure, tension produced at the side of the main body 5a of the carcass 5 from the bead portion 1 to the sidewall portion 2 during the running of the tire under loading is effectively utilized by the bead portion reinforcing cord layer 8 to improve tensile rigidity. Also compression rigidity is improved by arranging the reinforcing cord layer 8 against the fall-down phenomenon at the side of the turnup portion 5b. Therefore, the effect of controlling the fall-down phenomenon is developed by the improvement of both the rigidities, whereby compression strain applied to the end part of the turnup portion 5b is reduced to improve the bead portion durability.

The second countermeasure develops the effect of controlling the fall-down of the bead portion 1 by the hard rubber stiffener rubber segment 7A-1 and the effect of mitigating compression strain applied to the end part of the turnup portion 5b by the soft stiffener rubber segment 7A-2, so that it is said to be an effective means for improving the bead portion durability. Therefore, the separation failure of the bead portion 1 is improved by using the first and second countermeasures together as compared with the conventional technique.

In general, the belt produces a special torsional deformation force in both a deformation beginning zone and deformation returning zone of the belt at leading end part just before and after the entrance into a state of contacting the tread portion of the tire during the running under loading with ground and trailing end part just before and after the separation of the tread portion from the ground contacting state. Such a deformation force distorts the sidewall portion through the carcass. Such distorting is applied to the turnup portion as a large shearing strain along the circumference of the bead portion to bring about the occurrence of separation failure in the turnup portion based on such a special shearing strain. The third countermeasure advantageously controls the occurrence of such a separation failure in form of adding to the first or second countermeasure, so that it is a considerably advanced means and produces a peculiar function and effect entirely different from those of the first and second countermeasures.

Recently, the use ratio of a low-section profile large-size radial tire (particularly for use in truck and bus) having an aspect ratio of not more than 70 is increasing, and hence the more prolongation of wear life and the more improvement of belt durability in the tread rubber of a new large-size radial tire are rapidly advanced to prolong the service life of the new tire. On the other hand, it is considerably demanded to more increase the recapping number and the recapping ratio of these tires. Under the above circumstances, it is the present condition that the above three countermeasures can not provide tires having a bead portion durability capable of sufficiently following to persistent change of such a tire development.

SUMMARY OF THE INVENTION

It is, therefore, an object of the invention to provide a large-size pneumatic radial tire, particularly a radial tire for truck and bus use having an aspect ratio of not more than 70 which can develop a considerably improved bead durability, particularly a separation resistance of an end of the turnup portion capable of sufficiently following to severe environmental change surrounding the above radial tire.

According to the invention, there is the provision of a pneumatic radial tire comprising a radial carcass of at least one rubberized cord ply reinforcing a pair of sidewall portions and a tread portion between a pair of bead cores embedded in a pair of bead portions and comprised of a main carcass body extending between the pair of the bead cores and a turnup portion wound around the bead core from an inside of the tire toward an outside thereof, and a stiffener rubber taperingly extending between the main carcass body and the turnup portion from the bead core toward an end of the tread portion, characterized in that said stiffener rubber is an integral structure of two or more rubber compositions having different hardnesses, wherein a rubber composition having a highest hardness among the above rubber compositions is located near to the main carcass body as a hard stiffener rubber member and a rubber composition having a hardness lower than the hardness of the hard stiffener rubber member is located along the turnup portion over the hard rubber stiffener rubber member as a soft stiffener rubber member, and the hard stiffener rubber member is convexly projected toward the outside of the tire at a cross-section of the tire in a region sandwiched between a normal line ($L_V$) drawn from an end of the turnup portion perpendicular to an outer surface of the main carcass body and a line segment ($L_H$) drawn from the end of the turnup portion up to the outer surface of the main carcass body in parallel to a rotating axial line of the tire, and a height of the hard rubber stiffener member from the outer surface of the main carcass body on a normal line drawn from a top of the convex projected portion perpendicular to the outer surface of the main carcass body is maximum in a region ranging from the line segment ($L_H$) toward the end of the tread portion.

In a preferable embodiment of the invention, a sheet-shaped rubber having 100% modulus smaller than that of a coating rubber for the carcass ply is arranged as a third stiffener rubber member between the hard stiffener rubber member at least existing in a region outward from the line segment ($L_H$) in the radial direction of the tire and the main carcass body. In this case, it is favorable that the third stiffener rubber member has a thickness of 0.7–4.5 mm.

In another preferable embodiment of the invention, a ratio $a_3/b_3$ is within a range of 0.6–9.0 and each of ratios $a_1/b_1$ and $a_2/b_2$ is smaller than the ratio $a_3/b_3$, where a, is a gauge of the hard stiffener rubber member on the normal line $L_V$ and $b_1$ is a gauge of the soft stiffener rubber member on the normal line $L_V$, and $a_2$ is a gauge of the hard stiffener rubber member on a normal line $L_{VH}$ drawn from an intersection point between the line segment $L_H$ and the hard stiffener rubber member perpendicular to the outer surface of the main carcass body and $b_2$ is a gauge of the soft stiffener rubber member on the normal line $L_{VH}$, and $a_3$ is a gauge of the hard stiffener rubber member on a vertical line L drawn from the top of the convex projected portion of the hard stiffener rubber member perpendicular to the outer surface of the main carcass body and $b_3$ is a gauge of the soft stiffener rubber member on the vertical line L. In this case, it is favorable that a ratio $a_3/(b_1+a_1)$ is not less than 0.3, and a ratio $a_2/(b_1+a_1)$ is not more than 0.4, and a ratio $a_1/(b_1+a_1)$ is not more than 0.5.

In the other preferable embodiment of the invention, the hard stiffener rubber member continuously extends from the bead core toward the end of the tread portion and has a throttle portion located near to the bead core from the line segment $L_H$, or a fourth stiffener rubber member taperingly extending from the bead core toward the end of the tread portion is provided so as to have a hardness ranging between those of the hard stiffener rubber member and the soft stiffener rubber member and an end portion of the fourth stiffener rubber member near to the end of the tread portion and an end portion of the hard stiffener rubber member near to the bead core are joined to each other while forming a throttle portion, or the hard stiffener rubber member is separated from the bead core and is independently existent in the soft stiffener rubber member.

In a further preferable embodiment of the invention, the hard stiffener rubber member has a JIS hardness of 70–90°, and the soft stiffener rubber member has a JIS hardness of 40–68°, and the third stiffener rubber member has a JIS hardness of 55–75°, preferably 62–72°. Moreover, the JIS hardness is a value measured by a type A durometer according to a hardness test of vulcanized rubber described in JIS K6253-1993.

In a still further preferable embodiment of the invention, a bead portion reinforcing cord layer is arranged to extend inward from the end of the turnup portion in the radial direction along the outer surface of the turnup portion toward the inner surface of the main carcass body.

Moreover, the pneumatic radial tires according to the invention are adaptable as a tubeless tire having an aspect ratio of not more than 70 among truck and bus tires.

BRIEF DESCRIPTION OF THE DRAWINGS

The invention will be described with reference to the accompanying drawings, wherein.

DESCRIPTION OF PREFERRED EMBODIMENTS

Figure 1:
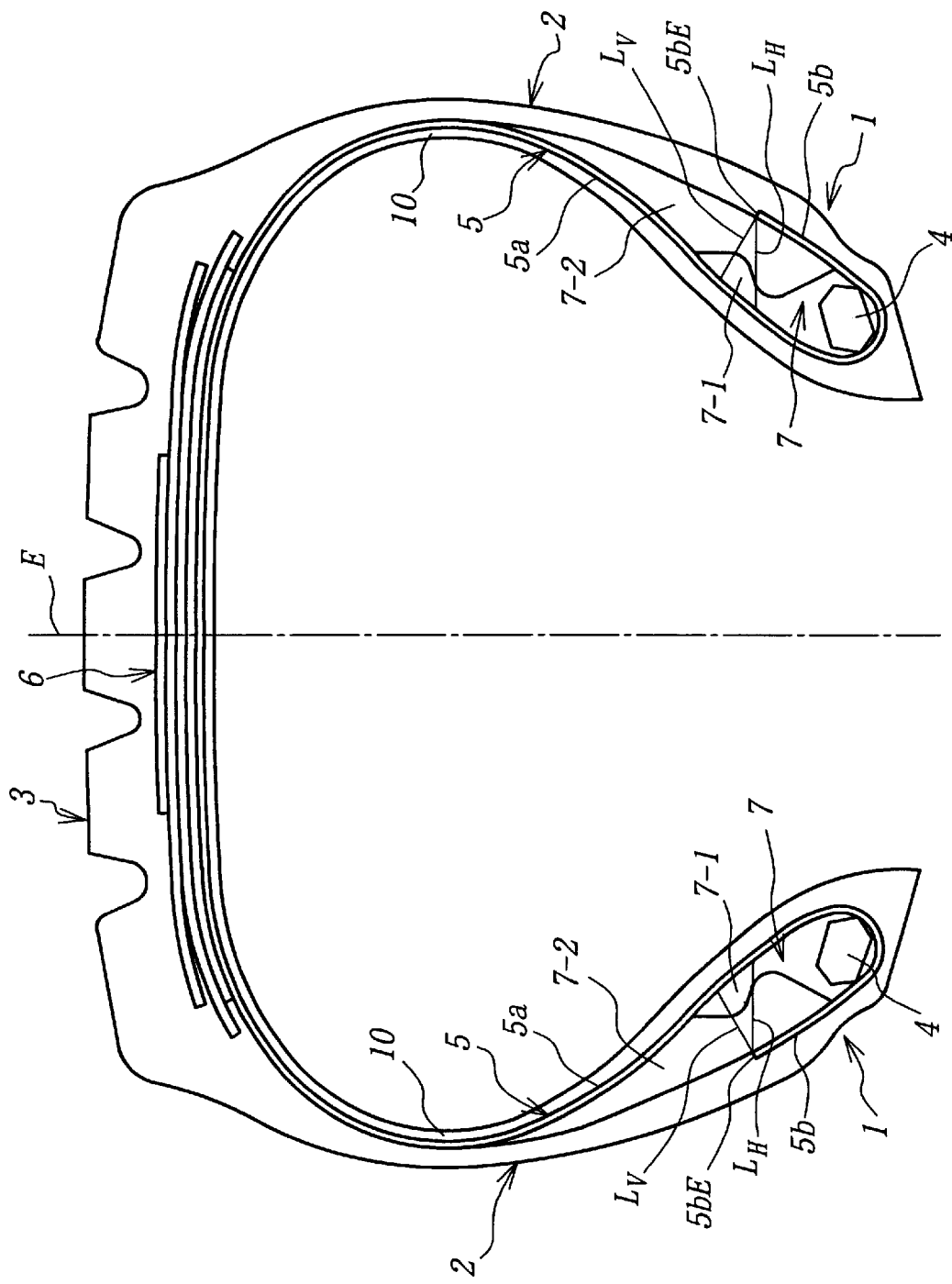
FIG. 1 is a diagrammatically section view of a first embodiment of the heavy duty pneumatic radial tire according to the invention.

In FIG. 1 is shown a first embodiment of the pneumatic tubeless radial tire for truck and bus according to the invention. The tire shown in FIG. 1 comprises a pair of bead portions 1, a pair of sidewall portions 2, a tread portion 3 extending between both the sidewall portions 2, a radial carcass 5 extending between a pair of bead cores 4 embedded in the bead portions 1 to reinforce these portions 1, 2, and 3 and comprised of at least one rubberized cord ply, one rubberized cord ply in the illustrated embodiment, and a belt 6 reinforcing the tread portion 3 on an outer circumference of the carcass 5. The carcass 5 is comprised of a main carcass body 5a extending between the pair of the bear cores 4 and a turnup portion 5b wound around the bead core 4 from an inside of the tire toward an outside thereof in a radial direction. The rubberized ply of the carcass 5 contains steel cords or super-high strength organic fiber cords such as aramid fiber cords arranged in parallel to each other in the radial direction. Also, the ply number of the carcass 5 is one in case of using the steel cords and one or more in case of using the aramid fiber cords.

Further, the tire comprises a stiffener rubber 7 taperingly extending along the main body 5a of the carcass 5 between the main body 5a and the turnup portion 5b from the bead core 4 toward an end portion of the tread portion 3. The stiffener rubber 7 plays a role as so-called reinforcing member made of a rubber composition. The stiffener rubber 7 is an integral structure of two or more rubber compositions having different hardnesses, wherein a rubber composition having a highest hardness among the above rubber compositions is located near to the main carcass body 5a as a hard stiffener rubber member 7-1 and a rubber composition having a hardness lower than the hardness of the hard stiffener rubber member 7-1 is located along the turnup portion 5b over an outer end of the hard rubber stiffener rubber member 7-1 in the radial direction as a soft stiffener rubber member 7-2.

Figure 2:
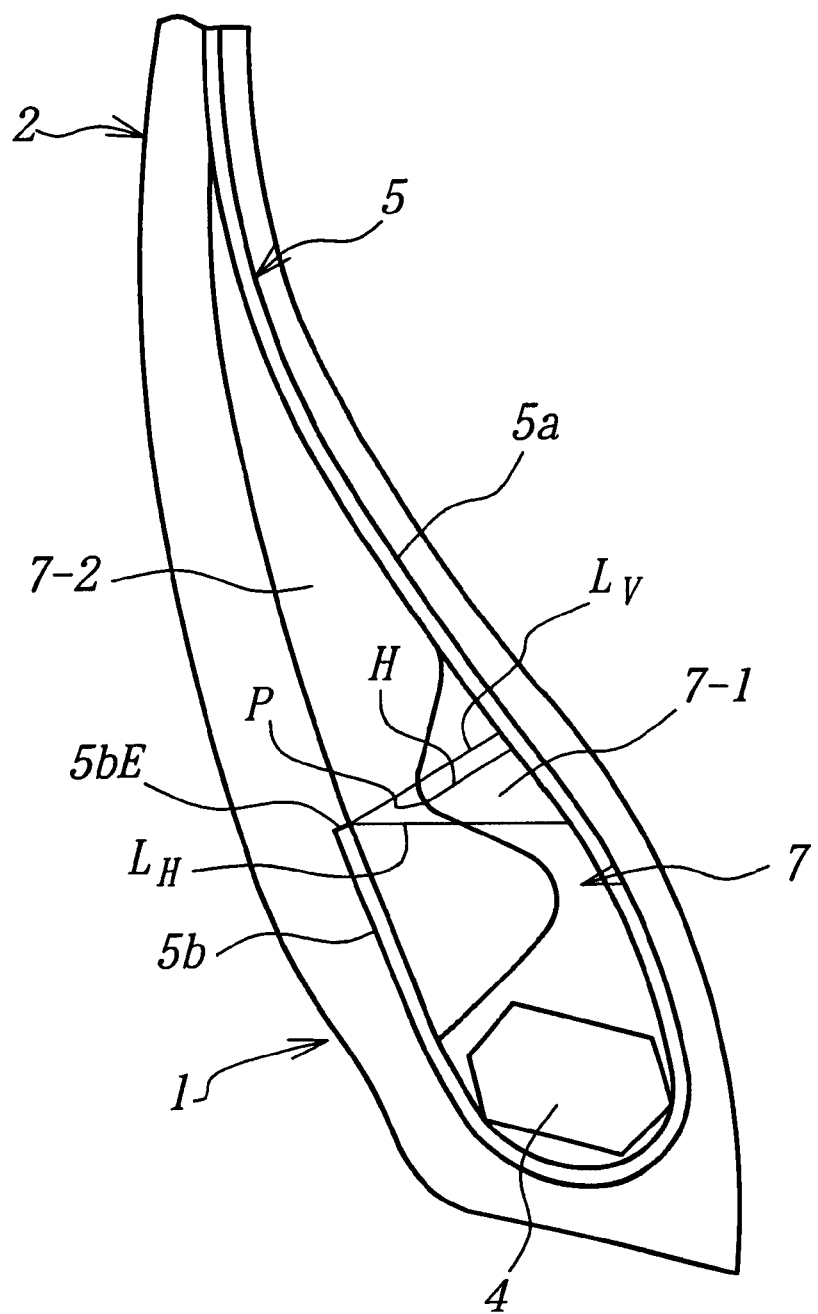
FIG. 2 is a diagrammatically section view of a main part of the tire shown in FIG. 1.

As shown in FIGS. 1 and 2, the hard stiffener rubber member 7-1 is convexly projected toward the outside of the tire in a triangular region at a section sandwiched between a vertical line $L_V$ drawn from an end 5bE of the turnup portion 5b of the carcass 5 to an outer surface of the main carcass body 5a and a line segment $L_H$ drawn from the end 5bE of the turnup portion 5b up to the outer surface of the main carcass body 5a in parallel to a rotating axial line of the tire. A top P of the convex projected portion of the hard stiffener rubber member 7-1 is existent in a region sandwiched between the vertical line $L_V$ and the line segment $L_H$. Moreover, start points of the vertical line L~ and the line segment LH are an inner point of the end 5bE of the turnup portion 5b in the widthwise direction of the tire.

A height H of the hard rubber stiffener member 7-1 from the outer surface of the main carcass body 5a on a vertical line drawn from the top P of the convex projected portion to the outer surface of the main carcass body 5a is maximum in a region ranging from the line segment LH toward an end of the tread portion 3. Moreover, the height of the hard stiffener rubber member 7-1 is measured on the normal lines drawn from the outer surface of the main carcass body 5a. The height of the hard stiffener rubber member 7-1 located on both sides of the top P is reduced in form of skirts of a mountain.

Figure 13:
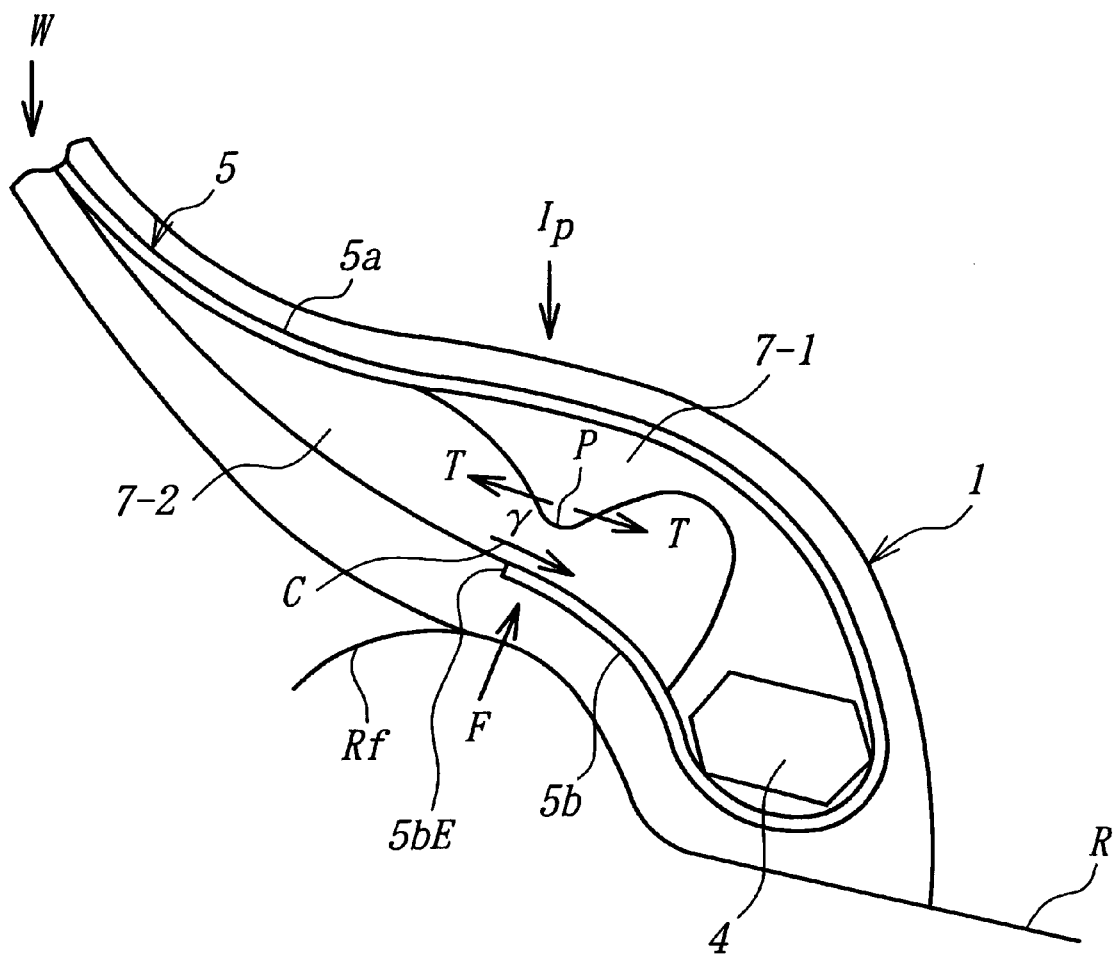
FIG. 13 is a diagrammatic view illustrating strain acted to a turnup portion of a carcass.
Figure 14:
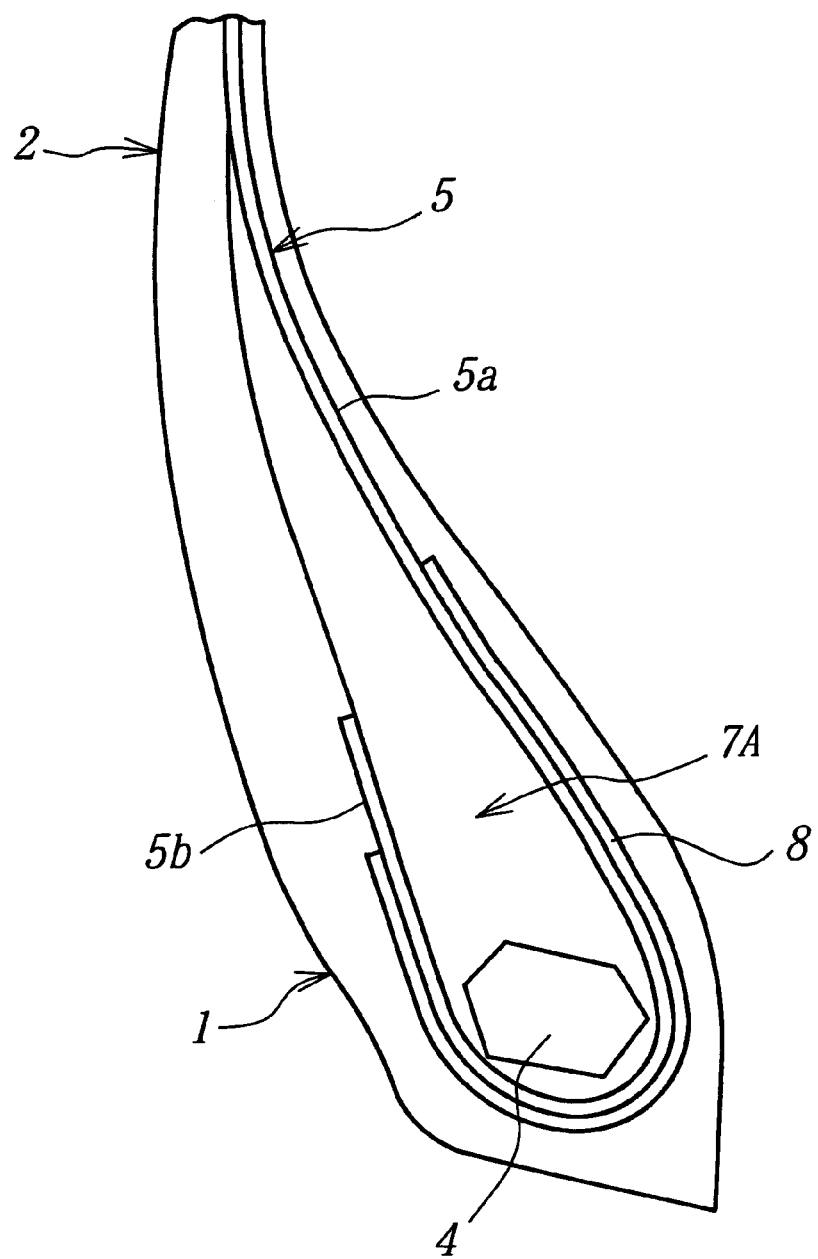
FIG. 14 is a diagrammatically section view of a main part of a first embodiment of the conventional tire.

FIG. 13 illustrates a section of a part of an assembly of the tire and a rim R at a ground contact portion when a service load or a load W corresponding to a maximum load capacity (kgf) defined in, for example, JATMA standard is applied to the assembly. As shown in FIG. 13, the bead portion 1 and the sidewall portion 2 show a large flexing deformation at a position corresponding to the ground contact portion. In the tubeless tire having a relatively low turnup height of the turnup portion 5b, a large reaction force F is applied from a flange Rf of the rim R to the bead portion 1 by such a flexing deformation, while a high internal pressure 1p (e.g. 7–9 kgf/cm$^2$) inherent to the truck and bus tire is applied from the inner surface of the tire to the bead portion 1. On the other hand, the load W is applied in a direction substantially perpendicular to the rotating axial line of the tire, so that a component of the load W is applied to the bead portion 1.

In the inside of the bead portion 1 applied with the component of the load W, reaction force F and internal pressure Ip, compression force is produced in the soft stiffener rubber member 7-2 located in the end 5bE of the turnup portion 5b and its neighborhood. But since the turnup portion itself inclusive of the end thereof is sufficiently high in compression rigidity owing to the cords (steel cords), a force resistant to the compression deformation is large and hence the above compression force gives shearing strain y in a direction shown by an arrow C to the soft stiffener rubber member 7-2 along the inner surface of the tire in the vicinity of the end 5bE of the turnup portion 5b. Since a shearing strain γ is repeatedly applied to the inner surface in the neighborhood of the end 5bE of the turnup portion 5b during the running of the tire under loading, the fatigue of the soft stiffener rubber member 7-2 is promoted and finally cracks are caused in the soft stiffener rubber member 7-2 along the inner surface in the neighborhood of the end 5bE of the turnup portion 5b and such cracks grow to bring about the separation failure.

On the other hand, the convex projected top P of the hard stiffener rubber member 7-1 and the neighborhood portions located on both sides thereof are crushed by the action of such a large reaction force F to cause shearing deformation based on compression because a Poisson's ratio of rubber is extremely near to 0.5. Since the soft stiffener rubber member 7-2 is softer than the hard stiffener rubber member 7-1, it easily receives the above shearing deformation and as a result, tension in a direction shown by an arrow T in FIG. 13 is given to the soft stiffener rubber member 7-2.

The tension T acts in a direction opposite to the action of the shearing strain γ to finally reduce the shearing strain y, whereby the fatigue of the soft stiffener member 7-2 along the inner surface in the vicinity of the end 5bE of the turnup portion 5b and occurrence of cracks accompanied therewith can be controlled and also the separation failure from the neighborhood of the end 5bE of the turnup portion 5b can effectively be prevented. Moreover, tension based on the crushing of rubber by the reaction force F is applied to the outer surface in the neighborhood of the end 5bE of the turnup portion 5b, so that the shearing strain is small and rubber fatigue is hardly caused.

When the convex projected top P of the hard stiffener rubber member 7-1 is located outward from the vertical line $L_V$ in the radial direction, the above tension T acts in a direction of more increasing the shearing strain y to promote the separation failure. On the other hand, when the top P is located inward from the line segment $L_H$ in the radial direction, the difference of rigidity between the outside and the inside of the end 5bE of the turnup portion 5b in the radial direction becomes considerably large. Hence the shearing strain considerably increases in the soft stiffener rubber member 7-2 in the end 5bE and its neighborhood along the circumference of the tire, which also promotes the separation failure. Therefore, the top P should be located inward from the vertical line $L_V$ but outward from the line segment $L_H$ in the radial direction.

Figure 3:
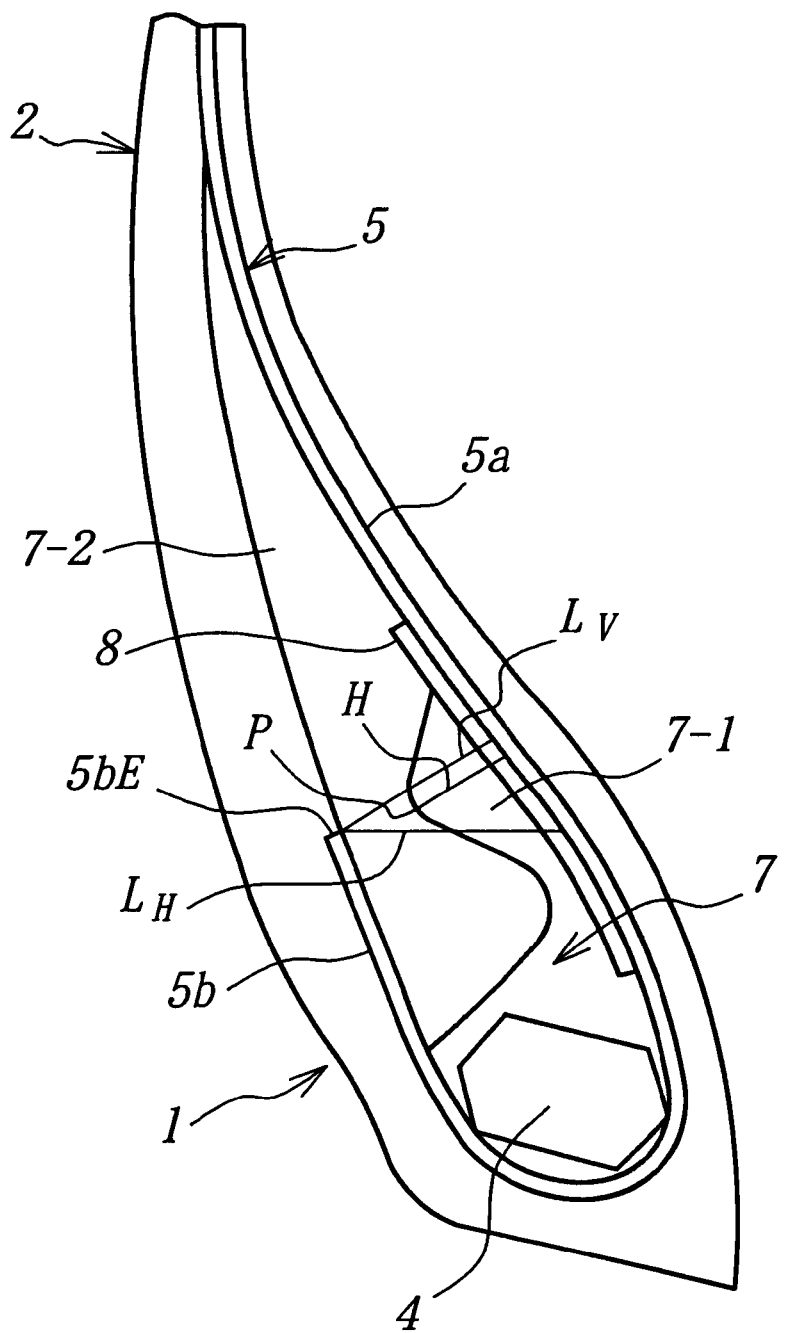
FIG. 3 is a diagrammatically section view of a main part of a second embodiment of the tire.

In FIG. 3 is shown a second embodiment of the tire, wherein the bead portion 1 is provided with a third stiffener rubber member 8 made of a sheet-shaped rubber having a 100% modulus lower than that of a coating rubber for the ply cord of the carcass 5 between the hard stiffener rubber member 7-1 existing in at least a region outward from the line segment $L_H$ in the radial direction (from an inner position of the line segment $L_H$ in the radial direction in the illustrated embodiment) and the main carcass body 5a. The third stiffener rubber member 8 has a thickness of 0.7–4.5 mm. The third stiffener rubber member 8 is at least arranged between the line segment $L_H$ and the vertical line $L_V$, but may be extended inward from the line segment $L_H$ and outward from the vertical line $L_V$ in the radial direction in view of a safety as shown in the illustrated embodiment.

Since the shearing deformation is large in the position of the height H of the convex projected top P of the hard stiffener rubber member 7-1 and its neighborhood corresponding to the ground contact region of the tread portion 3, the third stiffener rubber member 8 serves to mitigate the action of such a large shearing deformation to the main carcass body 5a to remove a fear of causing the separation failure between the hard stiffener rubber member 7-1 in the position of the height H of the top P and its neighborhood and the main carcass body 5a, which contributes to more improve the separation resistance of the bead portion 1. For this end, the third stiffener rubber member 8 should have the above defined 100% modulus, which is naturally smaller than that of the hard stiffener rubber member 7-1.

When the thickness of the third stiffener rubber member 8 is less than 0.7 mm, the effect of mitigating the shearing deformation is insufficient. When it exceeds 4.5 mm, it is impossible to ensure the thickness of the hard stiffener rubber member required for controlling the torsional deformation in the end 5bE of the turnup portion 5b and its neighborhood. In both the cases, the separation resistance is undesirably damaged in the end 5bE of the turnup portion 5b and its neighborhood. Moreover, the thickness of the stiffener rubber 7 is naturally restricted because the excessive thickness of the stiffener rubber 7 brings about the undesirable increase of tire weight, which does not match the demand for the reduction of the tire weight. It also considerably raises the temperature of the bead portion 1 to bring about thermal fatigue to thereby lower the durability of the bead portion 1.

Figure 4:
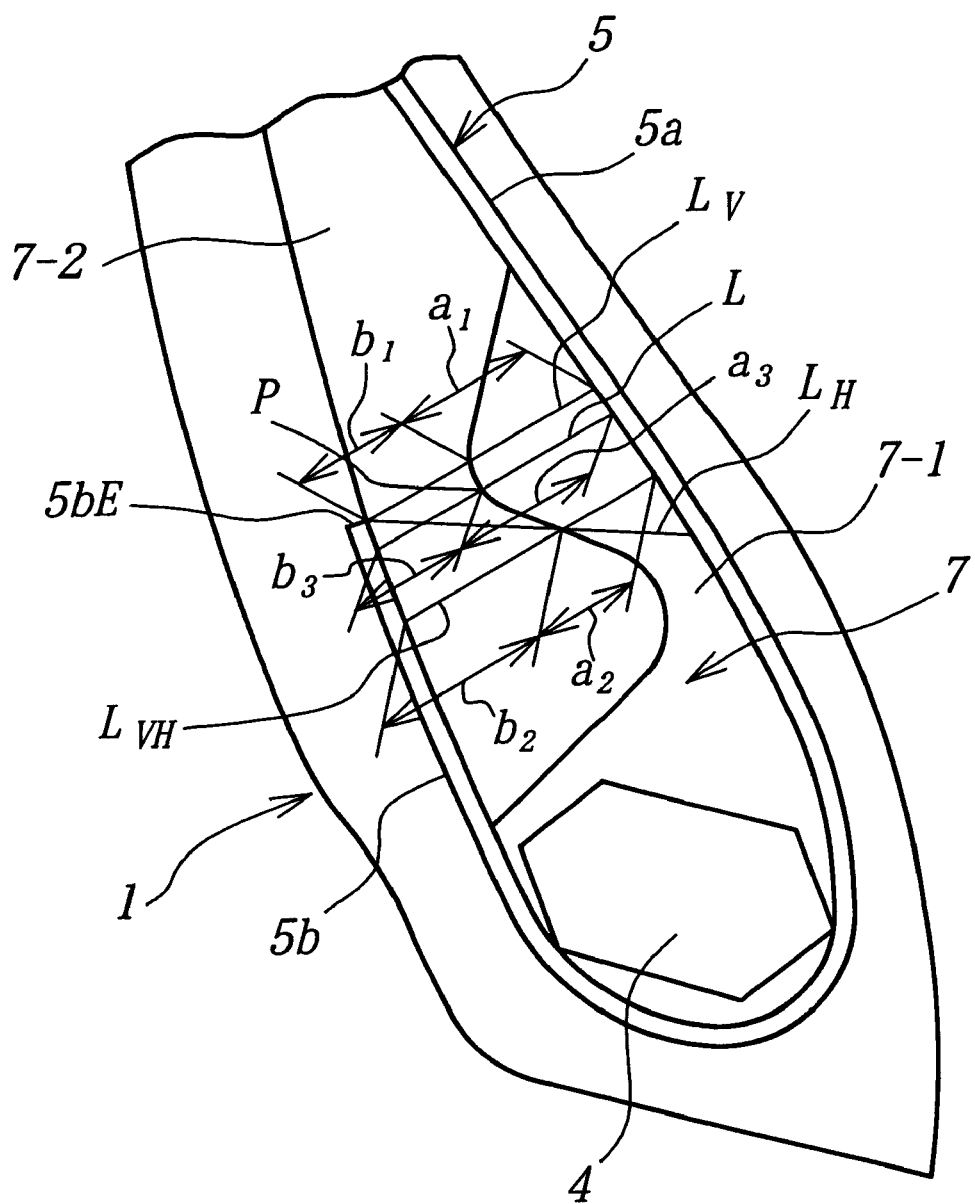
FIG. 4 is an enlarged section view of the main part shown in FIG. 2.
Figure 5:
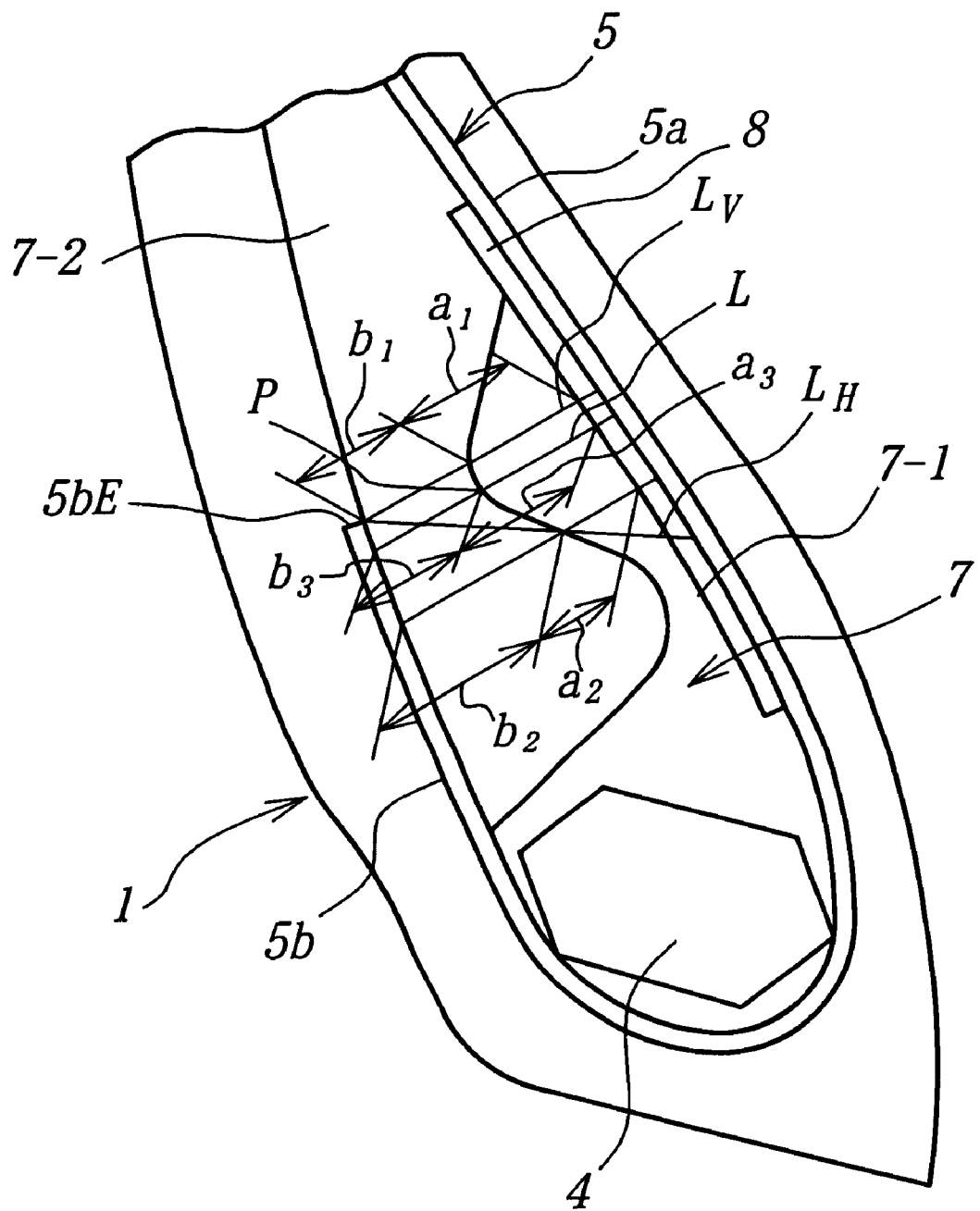
FIG. 5 is an enlarged section view of the main part shown in FIG. 3.

In FIGS. 4 and 5 is shown a relation between gauges of the hard stiffener rubber member 7-1 and the soft stiffener rubber member 7-2 existing in a region between the line segment $L_H$ and the vertical line $L_V$. As shown in FIGS. 4 and 5, when (a) gauges of the hard stiffener rubber member 7-1 and soft stiffener rubber member 7-2 measured on the vertical line $L_V$ are a1 (mm) and b1 (mm), (b) gauges of the hard stiffener rubber member 7-1 and soft stiffener rubber member 7-2 measured on the lien segment $L_H$ are $a_2$ (mm) and $b_2$ (mm), and (c) gauges of the hard stiffener rubber member 7-1 and soft stiffener rubber member 7-2 measured on a vertical line L drawn from the top P to the outer surface of the main carcass body 5a are $a_3$ (mm) and $b_3$ (mm), the invention is suitable to have conditions that (i) value of ratio $a_3/b_3$ is within a range of 0.6–9.0, (ii) value of ratio $a_1/b_1$ is less than the value of the ratio $a_3/b_3$, and (iii) value of ratio $a_2/b_2$ is less than the value of the ratio $a_3/b_3$.

When the ratio $a_3/b_3$ is less than 0.6, the hard stiffener rubber member 7-1 can not take a sufficiently projected shape and hence the sufficient shearing deformation can not be obtained. Also if it is intended to take the sufficiently projected shape, there is caused the inconvenience as previously mentioned. While, when the ratio $a_3/b_3$ exceeds 9.0, it is possible to take the sufficiently projected shape, but the sufficient gauge can not be ensured between the soft stiffener rubber member 7-2 and the neighborhood of the end 5bE of the turnup portion 5b under the condition of controlling the excessive heat generation of the bead portion 1 as mentioned above. Hence the effect by the arrangement of the soft stiffener rubber member 7-2 for the stress mitigation is considerably decreased to damage the separation resistance. Also, when the values of the ratios $a_1/b_1$ and $a_2/b_2$ are more than the value of the ratio $a_3/b_3$, the hard stiffener rubber member 7-1 can not take the sufficiently projected shape.

Further, it is favorable to satisfy relations that (iv) value of ratio $a_3/(a_1+b_1)$ is not less than 0.3, (v) value of ratio $a_2/(a_1+b_1)$ is not more than 0.4 and (vi) value of ratio $a_1/(a_1+b_1)$ is not more than 0.5 based on the total gauge $(a_1+b_1)$ of the stiffener rubber 7 measured on the vertical line $L_V$.

When the ratio $a_3/(a_1+b_1)$ is less than 0.3, the ratio $a_2/(a_1+b_1)$ is more than 0.4 and the ratio $a_1/(a_1+b_1)$ is more than 0.5, the hard stiffener rubber member 7-1 can not take the sufficiently projected shape likewise the above case and hence the sufficient shearing deformation can not be obtained. Therefore, sufficient tension T (see FIG. 13) can not be produced and the effect of mitigating the shearing strain γ of the soft stiffener rubber member 7-2 located at the inner surface of the neighborhood of the end 5bE of the turnup portion 5b is offset (see FIG. 13). Even in this case, it is premised that the thickness of the stiffener rubber 7 is not considerably increased.

Figure 6:
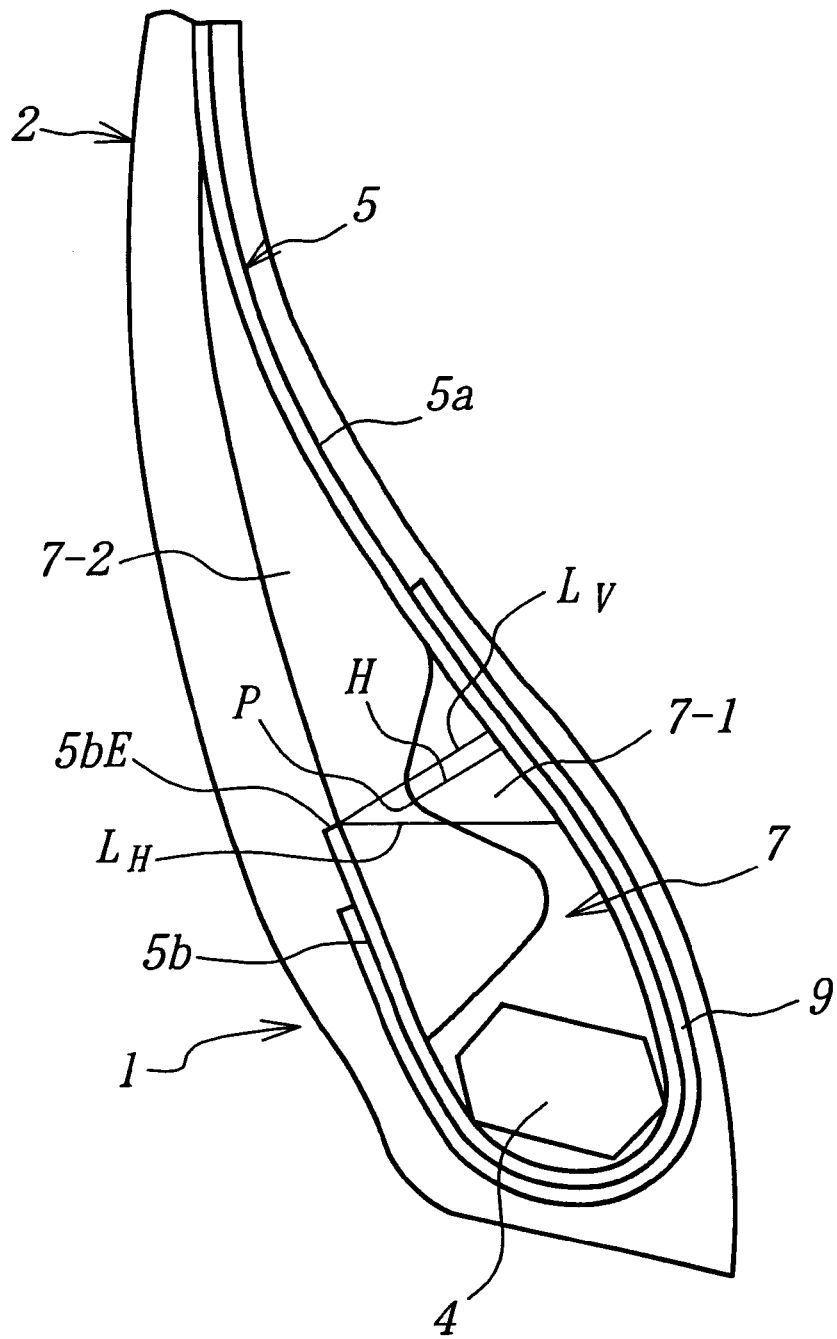
FIG. 6 is a diagrammatically section view of a main part of a third embodiment of the tire.
Figure 7:
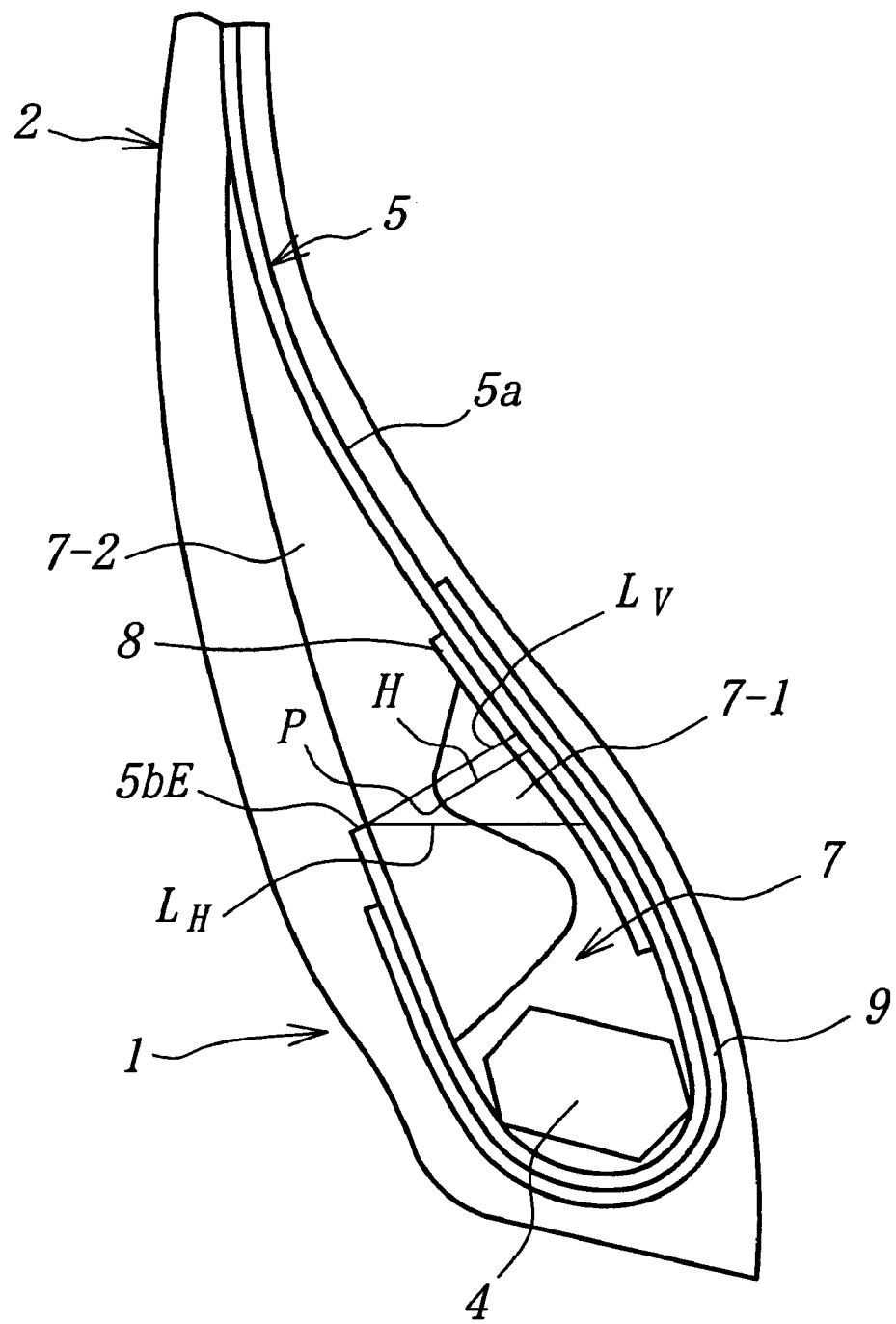
FIG. 7 is a diagrammatically section view of a main part of a fourth embodiment of the tire.

FIG. 6 is a third embodiment of the tire, wherein a rubberized steel cord layer is applied as a bead portion reinforcing layer 9 to the bead portion 1 shown in FIG. 2, and FIG. 7 is a fourth embodiment of the tire, wherein a rubberized steel cord layer is applied as a bead portion reinforcing layer 9 to the bead portion 1 shown in FIG. 3. The hard stiffener rubber members 7-1 in the bead portions 1 shown in FIGS. 1 to 7 are made of the same rubber composition and have a throttle portion between the line segment $L_H$ and an outer peripheral surface of the bead core 4. The projected top P of the hard stiffener rubber member 7-1 shown in FIGS. 6 and 7 is existent between the line segment $L_H$ and the vertical line $L_V$.

Figure 8:
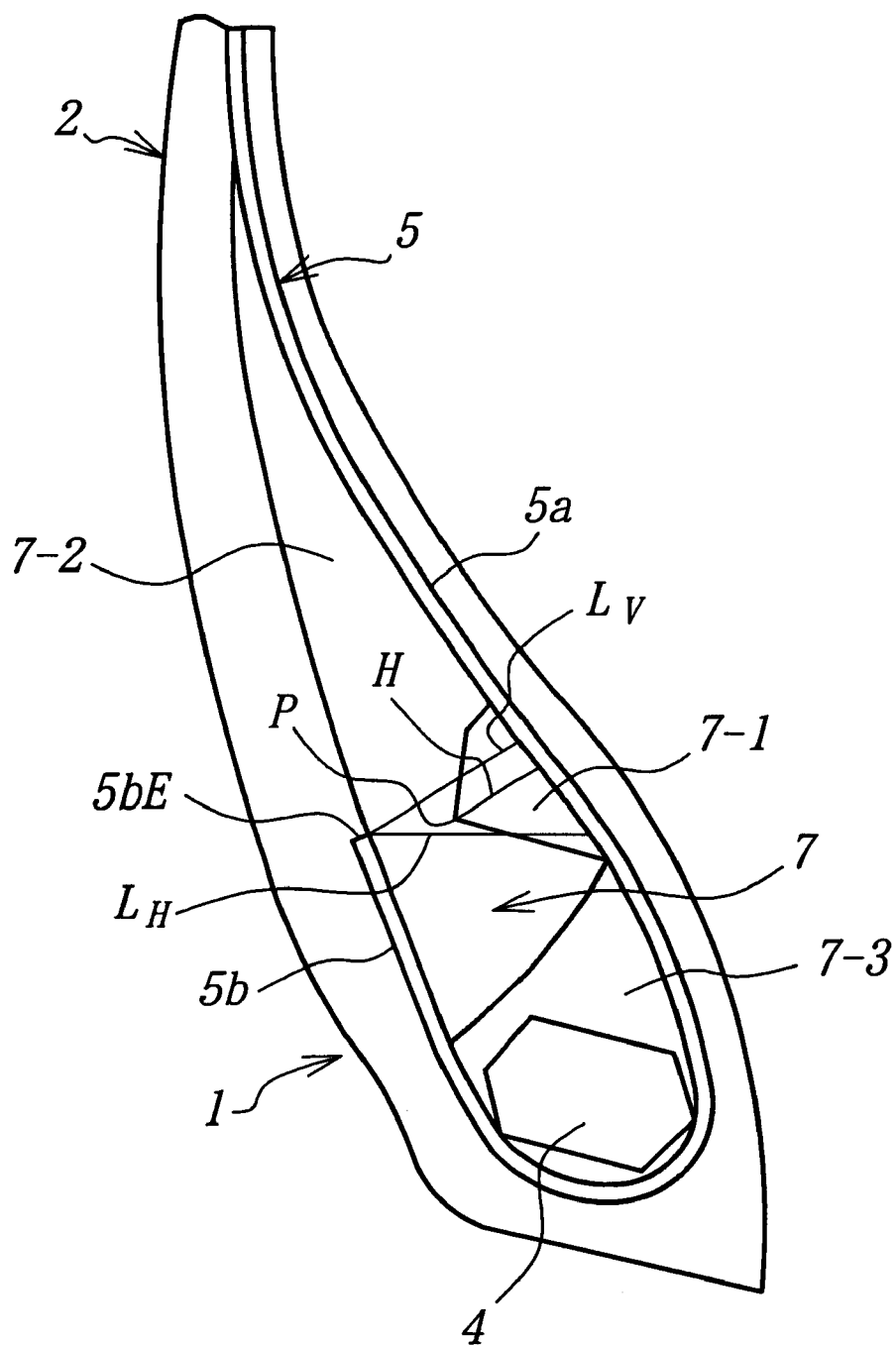
FIG. 8 is a diagrammatically section view of a main part of a fifth embodiment of the tire.
Figure 9:
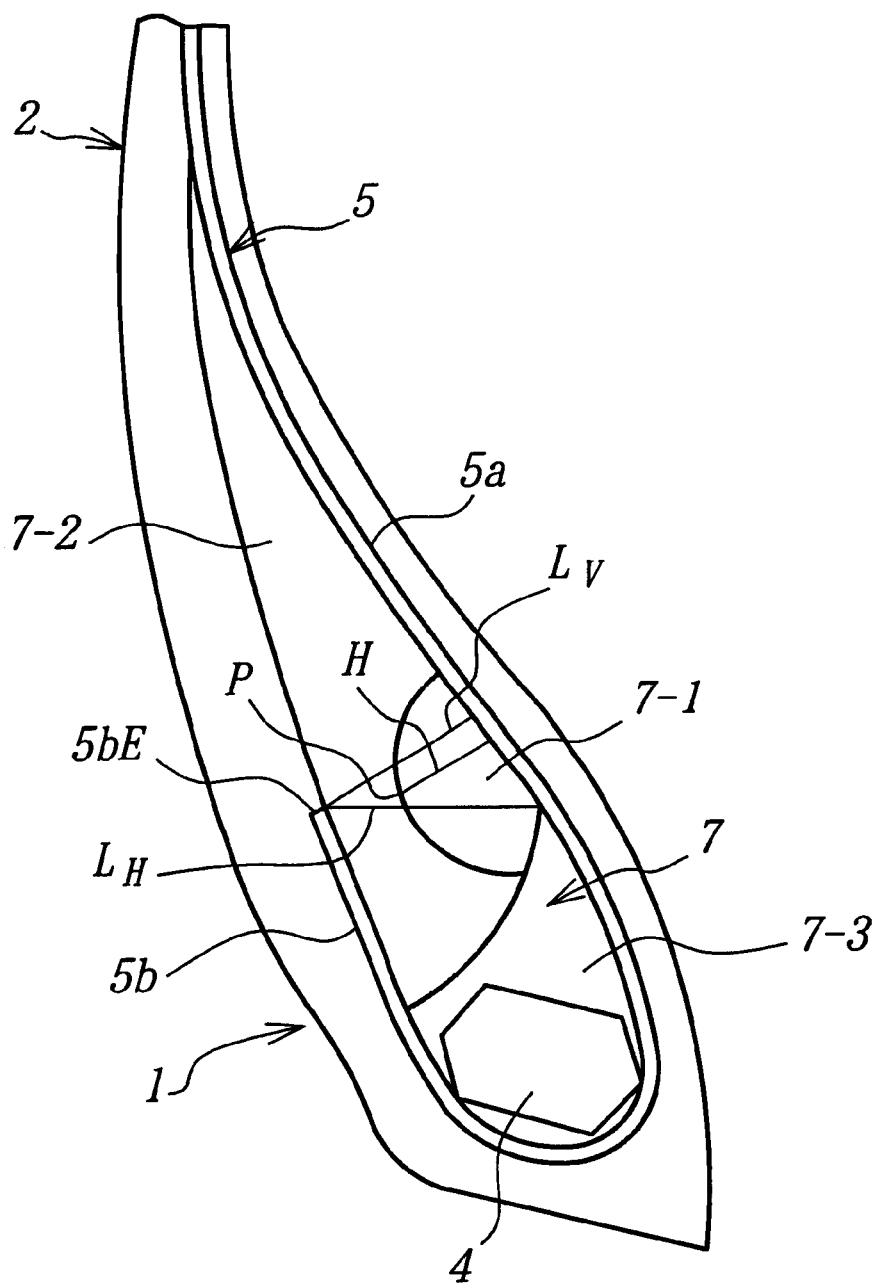
FIG. 9 is a diagrammatically section view of a main part of a sixth embodiment of the tire.

In FIGS. 8 and 9 are shown fifth and sixth embodiments of the tire, wherein the bead portion 1 has a fourth stiffener rubber member 7-3 taperingly extending from the bead core 4 toward an end of the tread portion 3 and a hard stiffener rubber member 7-1 having a top P between the line segment LH and the vertical line LV and convexly projecting toward the outside of the tire and the fourth stiffener rubber member 7-3 has a hardness ranging between those of the hard stiffener rubber member 7-1 and the soft stiffener rubber member 7-2. The hard stiffener rubber member 7-1 shown in FIG. 8 has a deformed trapezoidal shape at section, while the hard stiffener rubber member 7-1 shown in FIG. 9 has substantially a semi-circular shape in section.

In FIG. 8, the hard stiffener rubber member 7-1 and the fourth stiffener rubber member 7-3 are joined to each other at a slight zone. In FIG. 9, the hard stiffener rubber member 7-1 and the fourth stiffener rubber member 7-3 are joined to each other at a zone wider than that of FIG. 8. These joint zones form a throttle portion to the soft stiffener rubber member 7-2. The top P of the hard stiffener rubber member 7-1 shown in FIG. 8 is existent on a corner between sides constituting an upper bottom of the modified trapezoidal shape at section, while the top P of the hard stiffener rubber member 7-1 shown in FIG. 9 is existent on a maximum height H of the arc at section.

Figure 10:
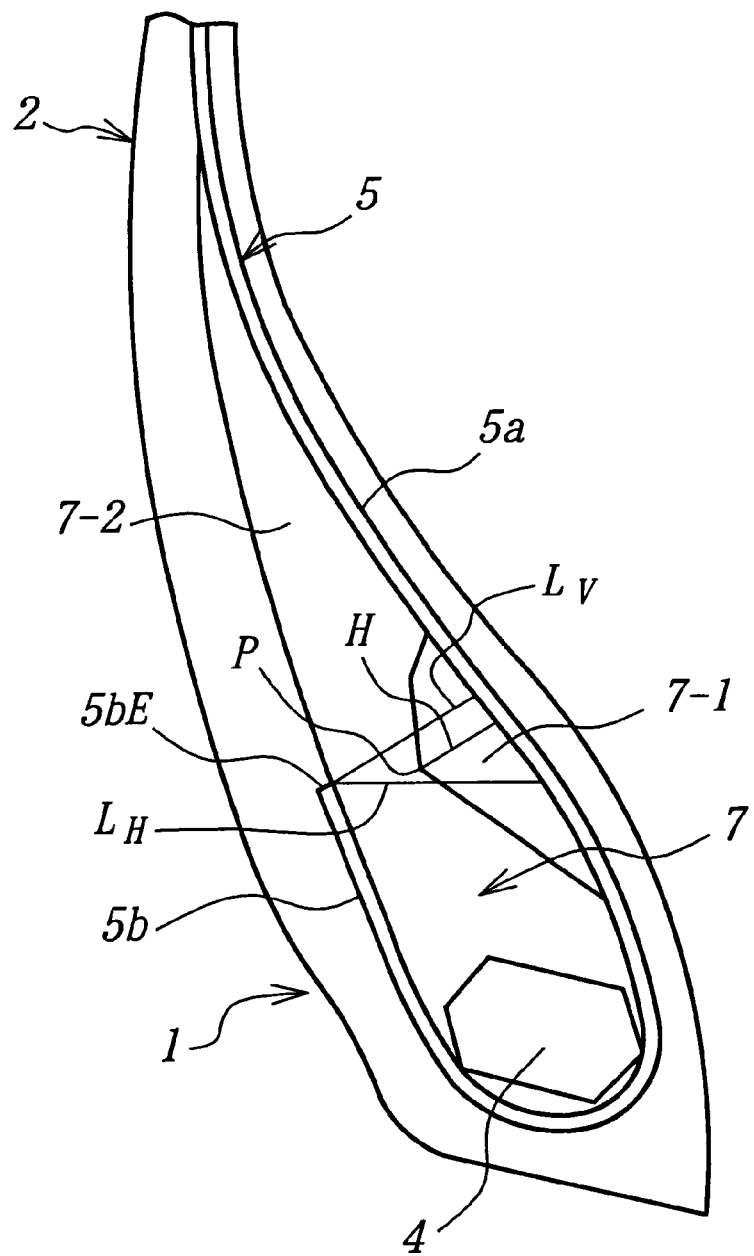
FIG. 10 is a diagrammatically section view of a main part of a seventh embodiment of the tire.
Figure 11:
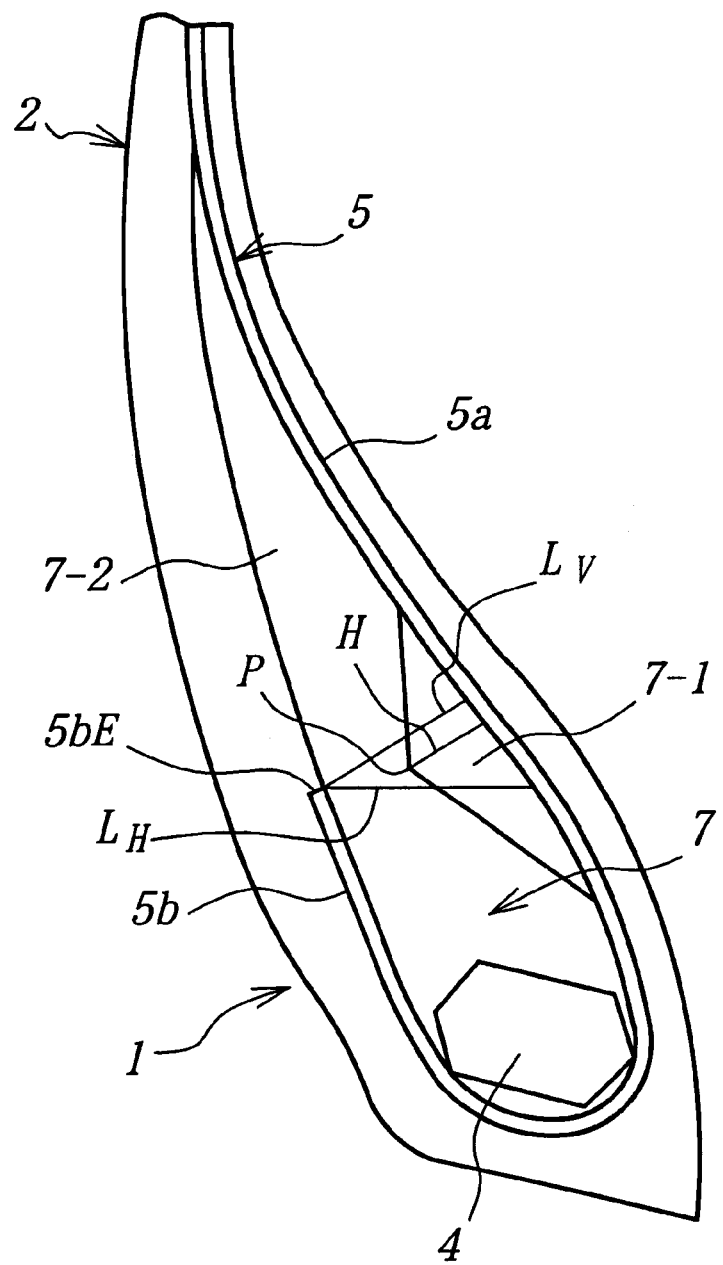
FIG. 11 is a diagrammatically section view of a main part of an eighth embodiment of the tire.
Figure 12:
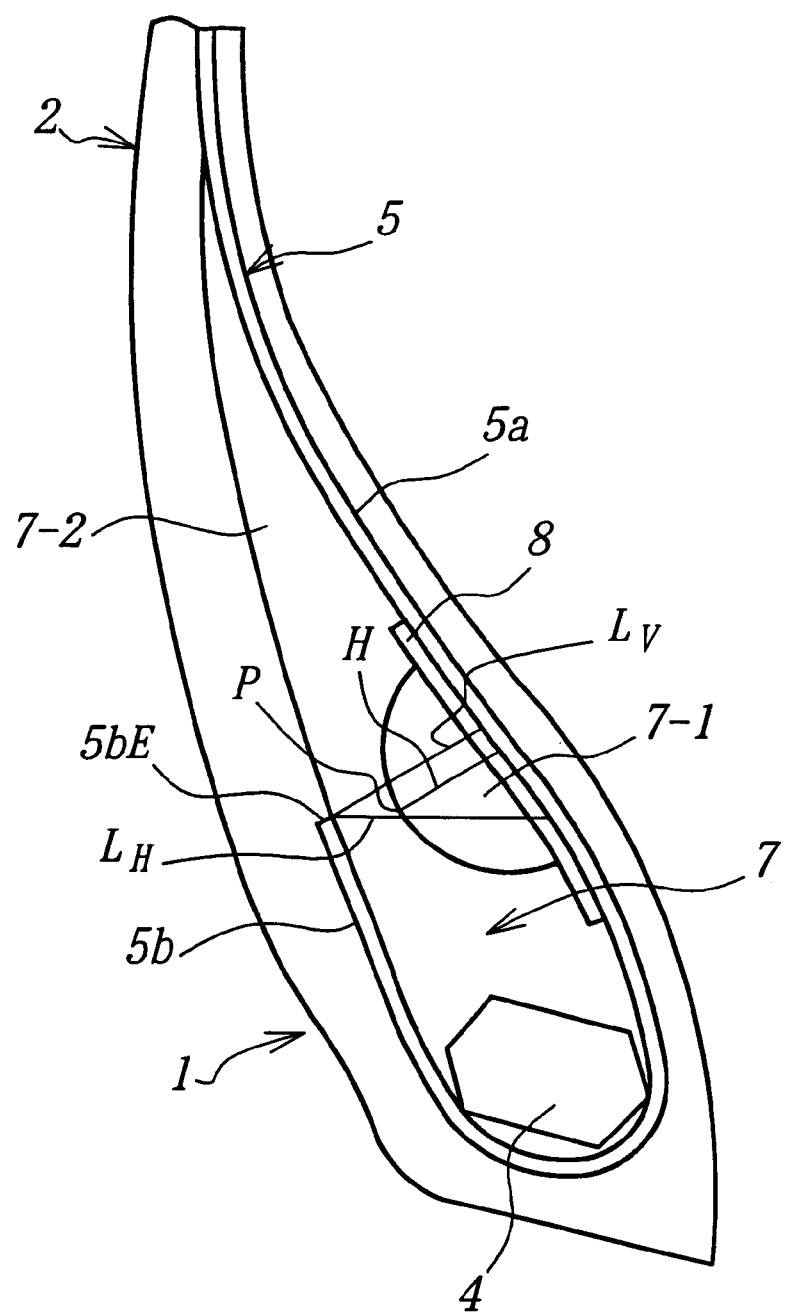
FIG. 12 is a diagrammatically section view of a main part of a ninth embodiment of the tire.

In FIGS. 10 to 12 are shown seventh to ninth embodiments of the tire, wherein the bead portion 1 has such a stiffener rubber 7 that the hard stiffener rubber member 7-1 having an inner end in the radial direction separated away from the bead core 4 is covered with the soft stiffener rubber member 7-2 in a zone other than portion contacting with the main carcass body 5a. The top P of the hard stiffener rubber member 7-1 shown in FIG. 10 is existent on a corner between sides constituting the modified trapezoidal shape at section, and the top P of the hard stiffener rubber member 7-1 shown in FIG. 11 is existent to match with an apex of substantially a triangular shape at section, and the hard stiffener rubber member 7-1 shown in FIG. 12 is located through the third stiffener rubber member 8 and the top P thereof is existent on a maximum height H of the arc at section.

The bead portion 1 in each of FIGS. 8 to 12 may be provided with the reinforcing layer 9, and also the bead portion 1 in each of FIGS. 8 to 11 may be provided with the third stiffener rubber member 8. Further, the stiffener rubber 7 in the bead portion 1 shown in FIGS. 8 to 12 satisfies interrelations of the gauges $a_1$, $b_1$, $a_2$, $b_2$, $a_3$ and $b_3$ as previously mentioned.

In the stiffener rubber 7, it is favorable that the hard stiffener rubber member 7-1 has a JIS hardness of 70–90°, and the soft stiffener rubber member 7-2 has a JIS hardness of 40–68°, and the third stiffener rubber member 8 has a JIS hardness of 55–75°. When the JIS hardness of the third stiffener rubber member 8 is less than 55°, the deformation concentrates in the third stiffener rubber member 8 to prematurely create cracks and there is a fear that the position of the crack forms a nucleus of separation failure. When it exceeds 750, the effect of mitigating the strain is too small. Moreover, numeral 10 shown in FIG. 1 is an inner liner rubber. Particularly, an inner liner rubber having an air impermeability is used in case of the tubeless tire.

The following examples are given in illustration of the invention and are not intended as limitations thereof.

There are provided 15° taper radial ply tires for truck and bus (tubeless tires) of Examples 1–19 having a tire size of 285/60R22.5 (aspect ratio: 60) and a common structure shown in FIG. 1 other than construction of a stiffener rubber 7 and presence or absence of a bead portion reinforcing layer 9, wherein a radial carcass 5 is one ply of steel cords, and 100% modulus of a coating rubber for the cord of the carcass 5 is 0.5 kgf/cm$_2$ and a belt 6 is comprised of four cross steel cord layers.

Figure 15:
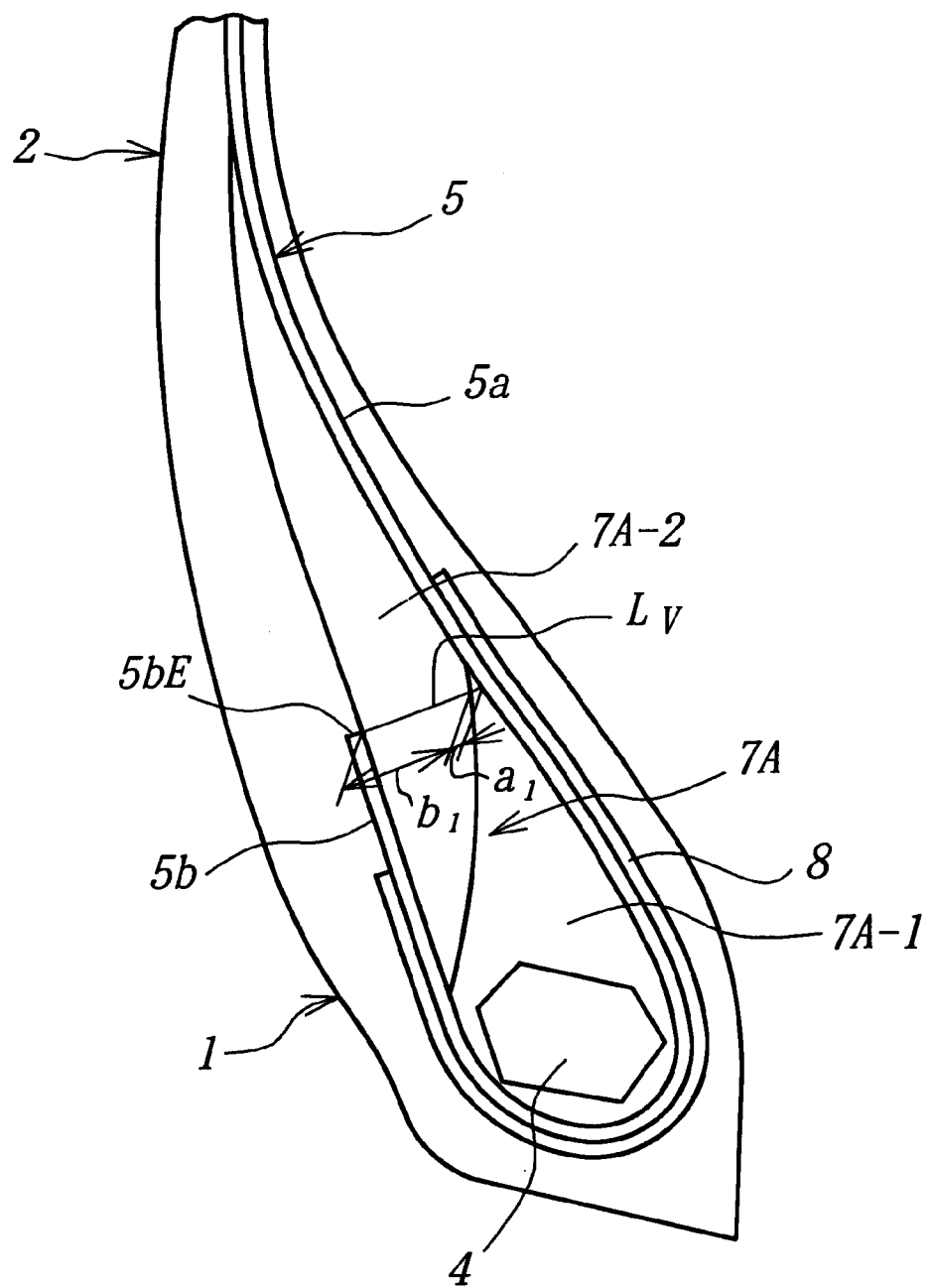
FIG. 15 is a diagrammatically section view of a main part of a second embodiment of the conventional tire.
Figure 16:
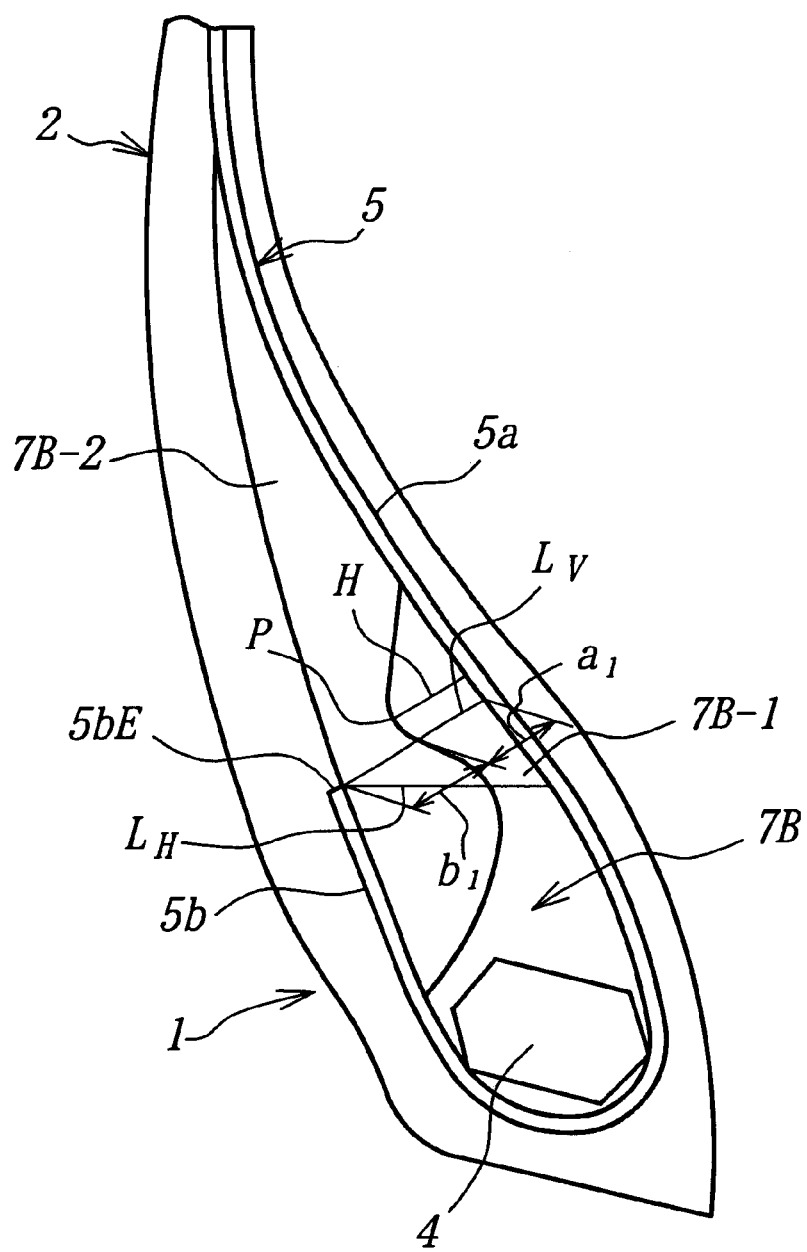
FIG. 16 is a diagrammatically section view of a main part of a first embodiment of the comparative tire.
Figure 17:
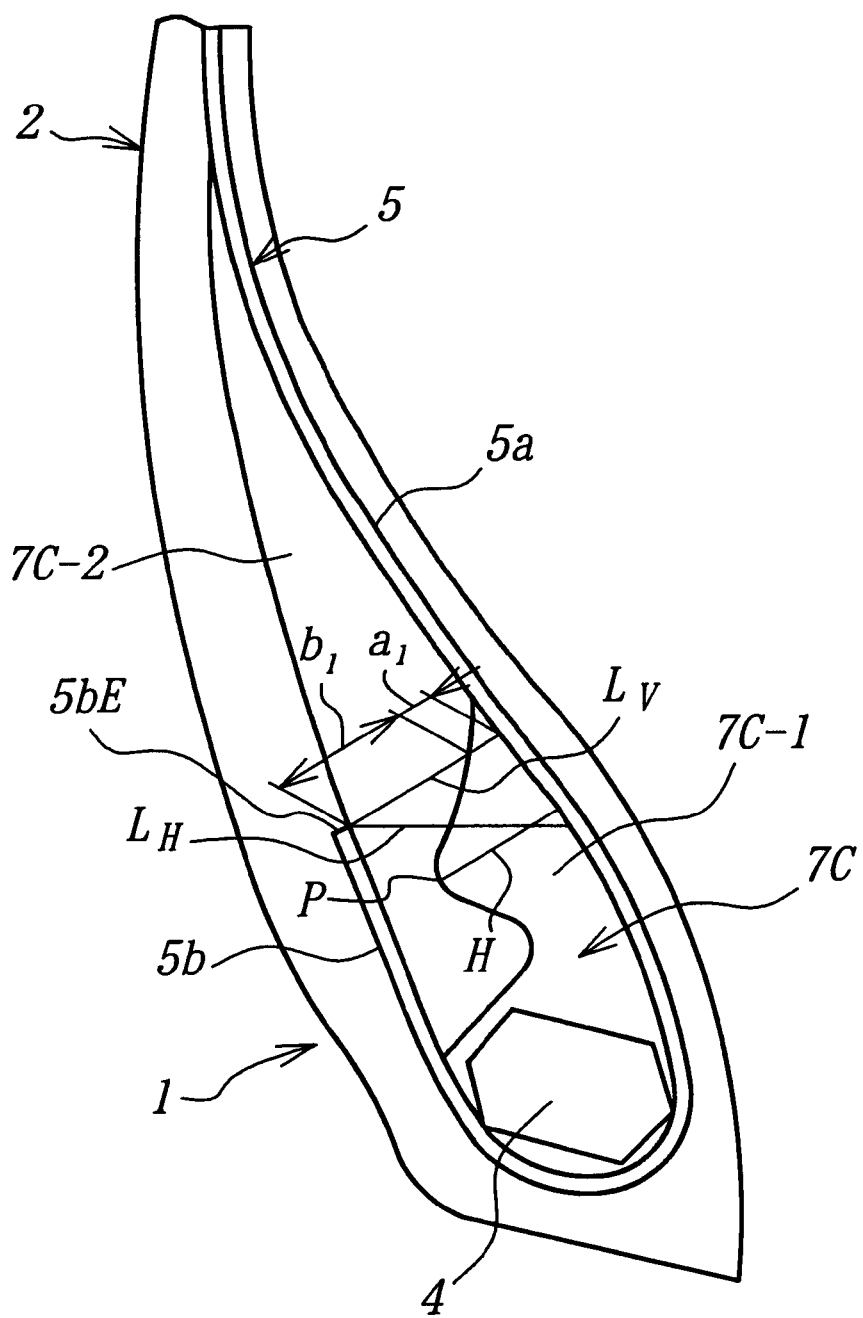
FIG. 17 is a diagrammatically section view of a main part of a second embodiment of the comparative tire.

Further, there are provided tires of conventional example and Comparative Examples 1 and 2 having the same tire size and common structure as mentioned above except that the conventional tire has a stiffener rubber 7A shown in FIG. 15, and the tire of Comparative Example 1 has a stiffener rubber 7B shown in FIG. 16 in which a top P of a hard stiffener rubber member 7B-1 is located outward from a vertical line $L_V$ in the radial direction, and the tire of Comparative Example 2 has a stiffener rubber 7C in which a top P of a hard stiffener rubber member 7C-1 is located inward from a line segment $L_H$ in the radial direction. The hard stiffener rubber members 7-1, 7A-1, 7B-1 and 7C-1 have a JIS hardness of 80°, and the soft stiffener rubber members 7-2, 7A-2, 7B-2 and 7C-2 have a JIS hardness of 55°.

With respect to the tires of Examples 1–19, Conventional Example and Comparative Examples 1–2, when the gauge ($a_1+b_1$) is abbreviated as $X_0$ and the third stiffener rubber member 8 is abbreviated as $S^T8$ gauge ratios $a_1/X_0$, $a_2/X_0$ and $a_3/X_0$, presence or absence of $S_T8$ and $M_{100}$ (100% modulus, kgf/cm$^2$), JIS hardness and thickness of $S_T8$ are shown in Tables 1 and 2.

Then, a test for bead portion durability is carried out by a drum testing machine under the following conditions with respect to each of the above tires.

That is, the tire is assembled onto a standard rim of 9.00×22.5 as an approved rim described in JATMA standard (1998 Year Book) and inflated under a maximum air pressure of 9.00 kgf/cm$^2$ (according to the above JATMA standard), which is pushed on a drum rotating at a surface speed of 60 km/h under a load of 5000 kgf corresponding to about 1.6 times a maximum load capacity of 3150 kg per tire (according to the above JATMA standard) and run until the occurrence of trouble in the bead portion 1.

At the time of causing the trouble in the bead portion 1, the running distance until the occurrence of trouble is measured, and then the tire is taken out from the drum and dissected to measure trouble state. The running distance is evaluated as a bead portion durability and represented by an index in Tables 1 and 2 on the basis that the running distance of the conventional tire is 100, wherein the larger the index value, the better the property. The trouble state is divided into separation failure in the inner surface of the end 5bE of the turnup portion 5b and its neighborhood and separation failure in the outer surface of the main carcass body 5a at a position corresponding to the end 5bE of the turnup portion 5b. The former is abbreviated as TU separation and the latter is abbreviated as CB separation in Tables 1 and 2.

TABLE 1

| Items | Conventional Example | Comparative Example 1 | Comparative Example 2 | Example 1 | Example 2 | Example 3 | Example 4 | Example 5 | Example 6 | Example 7 | Example 8 | Example 9 |
|---|---|---|---|---|---|---|---|---|---|---|---|---|
| Ratio $a_1/X_0$ | 0.05 | 0.4 | 0.1 | 0.3 | 0.3 | 0.3 | 0.3 | 0.3 | 0.3 | 0.3 | 0.3 | 0.3 |
| Ratio $a_2/X_0$ | — | — | — | 0.2 | 0.2 | 0.2 | 0.2 | 0.4 | 0.2 | 0.2 | 0.2 | 0.2 |
| Ratio $a_3/X_0$ | — | — | — | 0.5 | 0.5 | 0.7 | 0.3 | 0.5 | 0.5 | 0.5 | 0.5 | 0.5 |
| Presence or absence of $S_T8$ | — | absence | absence | presence | absence | absence | absence | absence | presence | presence | presence | presence |
| JIS hardness of $S_T8$ | — | — | — | 67 | — | — | — | — | 50 | 55 | 62 | 70 |
| Thickness of $S_T8$ (mm) | — | — | — | 2.0 | — | — | — | — | 2.0 | 2.0 | 2.0 | 2.0 |
| $S_T8$ $M_{100}$ (kgf/cm$^2$) | — | — | — | 0.38 | — | — | — | — | 0.14 | 0.22 | 0.32 | 0.43 |
| Durability (index) | 100 | 105 | 90 | 180 | 160 | 130 | 130 | 120 | 155 | 165 | 170 | 175 |
| Trouble state | TU separation | TU separation | TU separation | TU separation | CB separation | CB separation | TU separation | TU separation | CB separation | CB separation | CB separation | CB separation |

TABLE 2

| Items | Example 10 | Example 11 | Example 12 | Example 13 | Example 14 | Example 15 | Example 16 | Example 17 | Example 18 | Example 19 |
|---|---|---|---|---|---|---|---|---|---|---|
| Ratio $a_1/X_0$ | 0.3 | 0.3 | 0.3 | 0.3 | 0.3 | 0.3 | 0.3 | 0.3 | 0.3 | 0.3 |
| Ratio $a_2/X_0$ | 0.2 | 0.2 | 0.2 | 0.2 | 0.2 | 0.2 | 0.2 | 0.2 | 0.2 | 0.2 |
| Ratio $a_3/X_0$ | 0.5 | 0.5 | 0.5 | 0.5 | 0.5 | 0.5 | 0.5 | 0.5 | 0.5 | 0.5 |
| Presence or absence of $S_T8$ | presence | presence | presence | presence | presence | presence | presence | presence | presence | presence |
| JIS hardness of $S_T8$ | 72 | 75 | 80 | 67 | 67 | 67 | 67 | 67 | 67 | 67 |
| Thickness of $S_T8$ (mm) | 2.0 | 2.0 | 2.0 | 0.5 | 0.7 | 1.0 | 2.5 | 4.0 | 4.5 | 5.0 |
| $S_T8$ $M_{100}$ (kgf/cm$^2$) | 0.46 | 0.50 | 0.58 | 0.38 | 0.38 | 0.38 | 0.38 | 0.38 | 0.38 | 0.38 |
| Durability (index) | 170 | 165 | 155 | 155 | 165 | 170 | 175 | 170 | 165 | 155 |
| Trouble state | CB separation | CB separation | CB separation | CB separation | CB separation | CB separation | TU separation | TU separation | TU separation | TU separation |

As seen from the results of Tables 1 and 2, all tires of Examples 1–19 considerably improve the bead portion durability as compared with the tires of the conventional example and Comparative Examples 1 and 2. Also, the bead portion durability is more improved in the tires of Example 1 and 6–19 using the sheet-shaped third stiffener rubber member 8 as compared with the tires of Examples 2–5 using no third stiffener rubber member 8.

As mentioned above, according to the invention, shearing strain in the vicinity of the end of the turnup portion at a position corresponding to the ground contact region of the tire rotating under loading can advantageously reduced by projecting the hard stiffener rubber member into the soft stiffener rubber member and properly locating the top of the projected portion to the end of the turnup portion, and further the influence of shearing deformation of the hard stiffener rubber member upon the main carcass body can be mitigated by arranging the third stiffener rubber member, whereby the separation resistance at the end of the turnup portion and the main carcass body corresponding thereto can considerably be improved. Therefore, the invention can provide pneumatic radial tires advantageously suitable to large-size tubeless tires particularly having an aspect ratio of not more than 70.

What is claimed is:

1. A pneumatic radial tire comprising: a radial carcass having at least one rubberized cord ply reinforcing a pair of sidewall portions and a tread portion between a pair of bead cores embedded in a pair of bead portions, said radial carcass comprising a main carcass body extending between the pair of bead cores and a turnup portion wound around the bead cores from an inside of the tire toward an outside thereof, a stiffener rubber taperingly extending between the main carcass body and the turnup portion from the bead core toward an end of the tread portion, said stiffener rubber being an integral structure of two or more rubber compositions having different hardnesses, wherein a rubber composition having a highest hardness among said rubber compositions is located near to the main carcass body as a hard stiffener rubber member and a rubber composition having a hardness lower than the hardness of the hard stiffener rubber member is located along the turnup portion over the hard stiffener rubber member as a soft stiffener rubber member, and the hard stiffener rubber member being convexly projected toward the outside of the tire at a cross-section of the tire in a region sandwiched between a normal line $L_V$ drawn from an end of the turnup portion perpendicular to an outer surface of the main carcass body and a line segment $L_H$ drawn from the end of the turnup portion up to the outer surface of the main carcass body in parallel to a rotating axial line of the tire, and a height of the hard stiffener rubber member from the outer surface of the main carcass body on a normal line L drawn from a top of the convex projected portion perpendicular to the outer surface of the main carcass body is at a maximum in a region ranging from the line segment $L_H$ toward the end of the tread portion.

2. A pneumatic radial tire according to claim 1, further comprising a sheet-shaped rubber having 100% modulus smaller than that of a coating rubber for the carcass ply arranged as a third stiffener rubber member between the hard stiffener rubber member at least existing in a region outward from the line segment ($L_H$) in the radial direction of the tire and the main carcass body.

3. A pneumatic radial tire according to claim 2, wherein the third stiffener rubber member has a thickness of 0.7–4.5 mm.

4. A pneumatic radial tire according to claim 2, further comprising a fourth stiffener rubber member taperingly extending from the bead core toward the end of the tread portion is provided to have a hardness ranging between those of the hard stiffener rubber member and the soft stiffener rubber member and an end portion of the fourth stiffener rubber member near the end of the tread portion and an end portion of the hard stiffener rubber member near to the bead core are joined to each other while forming a throttle portion.

5. A pneumatic radial tire according to claim 2, wherein the hard stiffener rubber member has a JIS hardness of 70–90°, and the soft stiffener rubber member has a JIS hardness of 40–68°, and the third stiffener rubber member has a JIS hardness of 55–75°.

6. A pneumatic radial tire according to claim 1, wherein a ratio $a_3/b_3$ is within a range of 0.6–9.0 and each of ratios $a_1/b_1$ and $a_2/b_2$ is smaller than the ratio $a_3/b_3$, wherein $a_1$ is a gauge of the hard stiffener rubber member on the normal line $L_V$ and $b_1$ is a gauge of the soft stiffener rubber member on the normal line $L_V$, and $a_2$ is a gauge of the hard stiffener rubber member on the normal line $L_{VH}$ drawn from an intersection point between the line segment $L_H$ and the hard stiffener rubber member perpendicular to the outer surface of the main carcass body and $b_2$ is a gauge of the soft stiffener rubber member on the normal line $L_{VH}$, and $a_3$ is a gauge of the hard stiffener rubber member on a normal line L drawn from the top of the convex projected portion of the hard stiffener rubber member perpendicular to the outer surface of the main carcass body and $b_3$ is a gauge of the soft stiffener rubber member on the normal line L.

7. A pneumatic radial tire according to claim 6, wherein a ratio $a_3/(b_1+a_1)$ is not less than 0.3, a ratio $a_2/(b_1+a_1)$ is not more than 0.4, and a ratio $a_1/(b_1+a_1)$ is not more than 0.5.

8. A pneumatic radial tire according to claim 1, wherein the hard stiffener rubber member continuously extends from the bead core toward the end of the tread portion and has a throttle portion located near to the bead core from the line segment $L_H$.

9. A pneumatic radial tire according to claim 1, wherein the hard stiffener rubber member is separated from the bead core and is independently existent in the soft stiffener rubber member.

10. A pneumatic radial tire according to claim 1, wherein the hard stiffener rubber member has a JIS hardness of 70–90°, and the soft stiffener rubber member has a JIS hardness of 40–68°, and the third stiffener rubber member has a JIS hardness of 55–75°.

11. A pneumatic radial tire according to claim 1, further comprising a bead portion reinforcing cord layer arranged so as to extend inward from the end of the turnup portion in the radial direction along the outer surface of the turnup portion toward the inner surface of the main carcass body.

* * * * *